H. SILVESTER.
Felly-Plates.

No. 137,571.            Patented April 8, 1873.

WITNESSES
F. S. Davenport
Chas. D. Moody.

INVENTOR
Henry Silvester
by Moody and Davenport
his atty's.

AM. PHOTO-LITHOGRAPHIC CO. N.Y. (OSBORNE'S PROCESS.)

UNITED STATES PATENT OFFICE.

HENRY SILVESTER, OF ST. LOUIS, MISSOURI.

IMPROVEMENT IN FELLY-PLATES.

Specification forming part of Letters Patent No. 137,571, dated April 8, 1873; application filed September 5, 1872.

*To all whom it may concern:*

Be it known that I, HENRY SILVESTER, of St. Louis, in the county of St. Louis and State of Missouri, have invented a new and useful Improvement in Felly-Plates; and I do hereby declare that the following is a full and exact description of the same, reference being had to the accompanying drawing and to the letters of reference marked thereon.

Figure 1:
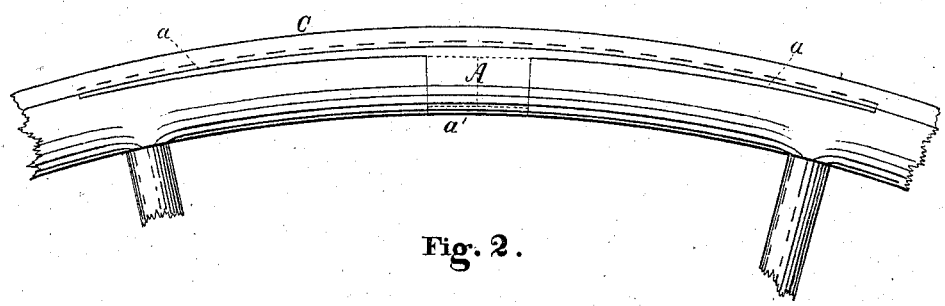
Figure 2:

Figure 1 represents a segment of a wheel containing the invention. It shows the tire attached. The dotted lines indicate the tenons on the ends of the adjoining fellies. The broken line indicates the upper line of plate. Fig. 2 is a central cross-section of Fig. 1.

Like letters of like kind indicate like parts.

This invention consists, mainly, in the combination of a felly-plate of peculiar construction with a tire having vertical flanges, as will be fully described hereinafter.

In the drawing, A represents a felly-plate, consisting, mainly, of two parts: First, a plate, $a$, in width nearly or quite that of the rim, and in length preferably longer than the distance between the spokes. The plate $a$ is countersunk into the rim on its outer side, which in turn is cut away to receive the plate. Second, the plate $a$, at its center, is extended inwardly so as to form a band, $a'$, that encircles the ends of the adjoining fellies.

Should it be desirable, the fellies can be cut away to enable the band $a'$ to come flush with the rim.

For the purpose of holding the plate A more firmly in position, the plate $a$ can be made concave on its inner side. Such construction adds strength and stiffness. When the plate $a$ is thus hollowed the fellies are shaped accordingly to fit it.

The advantages claimed for the above-described felly-plate are, first, it is economical in its manufacture and in its attachment; second, its form is one of great strength; third, it does not depend upon the insertion of bolts or screws through the rim; fourth, the band $a'$, clasping the ends of the fellies, prevents their splitting; fifth, by avoiding the use of bolts or projecting parts the appearance of the wheel is improved.

Having described my invention, what I claim as new therein, and desire to secure by Letters Patent, is—

The felly-plate A, consisting of the plate $a$ and the band $a'$, in combination with the tire C, provided with vertical flanges, and the rim of the wheel, substantially as described and shown.

This specification signed and witnessed this 28th day of August, 1872.

HENRY SILVESTER.

Witnesses:
   CHAS. D. MOODY,
   F. S. DAVENPORT.